Figure 1:
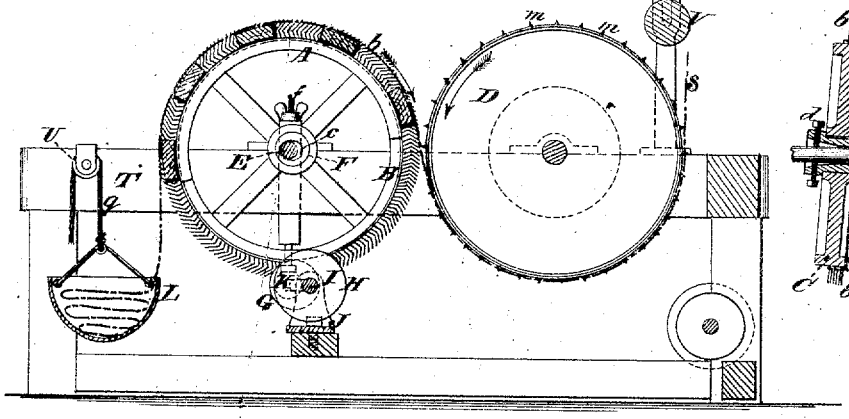

I. E. PALMER,

Assignor to himself and V. S. ALLIEN.

Apparatus for Stretching and Dressing Mosquito-Net and other Fabrics.

No. 8,978. Reissued Nov. 25, 1879.

Witnesses

John Becker

Ed Harris

Inventor

Isaac E. Palmer by his Attorneys

Brown & Brown

UNITED STATES PATENT OFFICE.

ISAAC E. PALMER, OF MIDDLETOWN, CONNECTICUT, ASSIGNOR, BY MESNE ASSIGNMENTS, TO HIMSELF AND VICTOR S. ALLIEN, OF NEW YORK CITY.

IMPROVEMENT IN APPARATUS FOR STRETCHING AND DRESSING MOSQUITO-NET AND OTHER FABRICS.

Specification forming part of Letters Patent No. 88,505, dated March 30, 1869; Reissue No. 8,978, dated November 25, 1879; application filed December 16, 1878.

*To all whom it may concern:*

Be it known that I, ISAAC E. PALMER, formerly of Hackensack, in the county of Bergen and State of New Jersey, now of Middletown, in the county of Middlesex and State of Connecticut, have invented certain new and useful Improvements in Apparatus for Stretching and Dressing Mosquito-Net and other Fabrics, of which the following is a full, clear, and exact description, reference being had to the accompanying drawings, forming part of this specification.

This invention consists in the combination, in a machine for stretching or tentering mosquito-net and other fabrics, of selvage carrying and stretching devices, mechanism for imparting motion to said devices, and a friction frame or surface arranged between the said devices, to serve as a drag to prevent the center portion or body of the fabric from running ahead of the sides or selvage portions, and thereby to obtain a regular or even stretch of the fabric throughout its entire width.

The invention also consists in the combination, in a machine for stretching and tentering mosquito-netting and other fabrics, of selvage carrying and stretching devices adapted to receive the two selvages of the fabric, and capable of moving independently of each other, a drying-cylinder, to which the fabric is delivered from the said selvage carrying and stretching devices, and friction driving-wheels, so applied to the said selvage carrying and stretching devices as to be capable of driving them at a velocity slightly higher than the drying-cylinder, so that the fabric may be delivered free or loose to the drying-cylinder, and either of said carrying or stretching devices may, whenever desirable, have its motion temporarily retarded relatively to the motion of the other in an automatic manner by the slipping of the friction driving-wheels.

The invention further consists in the combination, with independently-revolving selvage carrying and stretching rolls or wheels and an interposed expanding and contracting friction frame or structure, of stationary hubs, fitting to the said rolls or wheels and to the ends of the said friction frame or structure, and adjustable upon a stationary shaft both in a longitudinal and in an oblique direction for the purpose of varying the stretch and to adapt the apparatus to different widths of fabric.

The invention also consists in the combination, with the selvage carrying and stretching devices in a machine for stretching and tentering fabrics, of a vertically-adjustable support or receptacle, so arranged in front of and below the selvage carrying and stretching devices as to admit of the heft of the fabric between said support or receptacle and the said devices being increased or diminished for the purpose of regulating the run or stretch of the fabric over the said devices.

The invention also consists in the combination, in a machine for stretching or tentering and dressing mosquito-netting or other fabrics, of carrying and stretching devices for operating on the fabric near the selvages thereof, mechanism for imparting motion to the said carrying and stretching devices, a friction frame or surface arranged between the said carrying and stretching devices, and operating as a support and drag to the center or body of the fabric, and a heated drying-cylinder, to which the stretched or tentered fabric is delivered from the said carrying and stretching devices and the said friction frame or surface, the said cylinder during the drying operation forming a support for the fabric throughout its whole width, and effecting its drying in the same condition in which it has been tentered, and so preserving the straightness of its threads and the evenness of its meshes.

Figure 3:
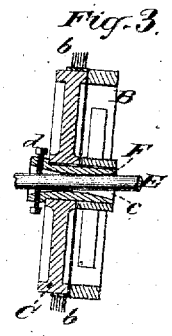
Figure 2:
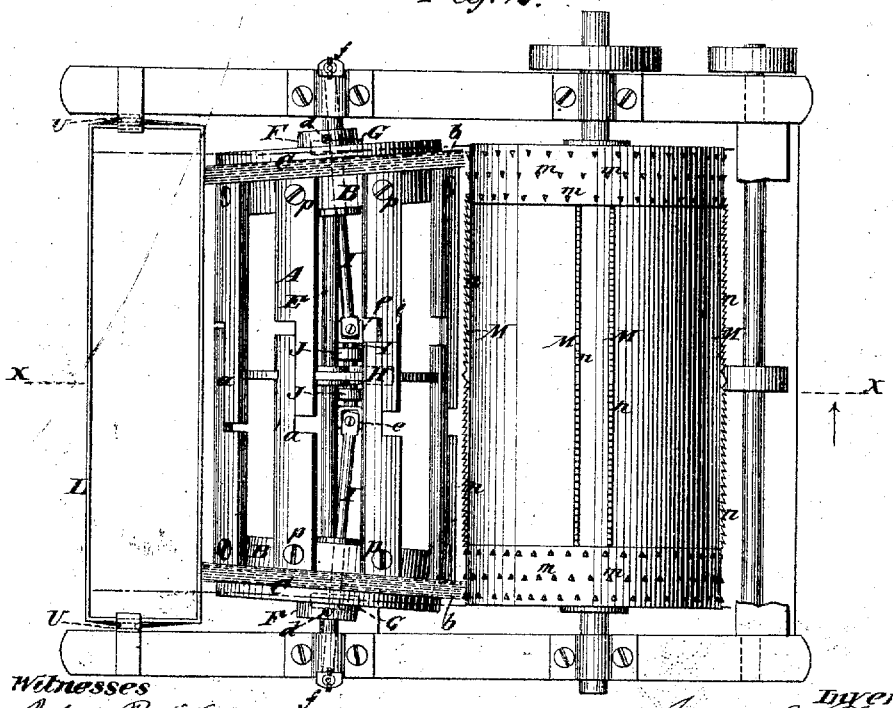

Figure 1 in the accompanying drawings represents a vertical longitudinal section of the principal parts of a stretching and dressing apparatus constructed according to my invention. Fig. 2 is a plan of the same. Fig. 3 is a transverse section of the same through one of the selvage carrying and stretching rolls or cylinders and one end of the friction frame or structure, that, in connection with the said rolls, serves to stretch the fabric as it passes over them.

T is the framing of the machine supporting the continuously-operating selvage carrying and stretching devices C C, the intermediate friction device or surface, and the revolving drying-cylinder D.

The friction device or surface represented consists of a frame composed of slats A A and heads B B, to which the said slats are secured, the said heads being arranged obliquely to each other, and the said slats, which form the actual friction-surface over which the fabric passes, being cut or divided, as shown at *a a* in Fig. 2, to admit of expansion and contraction to suit different widths of fabric and to effect variation in the stretch. The said frame is stationary when set for operation, and is represented as of an arched form, (see Fig. 1,) conforming substantially to the selvage-carrying devices; but it might be of flat form.

The friction surface or device, by serving as a drag to the body or center portion of the fabric as the latter is carried over it by the continuously-operating selvage carrying and stretching devices C C, prevents said center portion from running ahead, as it is otherwise apt to do, of the edges or selvages, and thereby causes the stretching to be performed evenly throughout the whole width of the fabric.

The selvage carrying and stretching devices C C may be of any suitable endless character, but are here shown as of circular shape, constituting selvage-feeding and fabric-stretching rolls, wheels, or cylinders, they being provided with card-clothing *b b* on their peripheries, to secure a proper hold on the fabric.

It is desirable in some cases that these selvage-carrying and stretching devices or rolls C C should travel at a somewhat greater velocity than the steam or other drying cylinders D, so that the fabric *s*, in passing from the former to the latter, will be delivered without any longitudinal tension to the drying-cylinder, which is not designed to exert any stretching action or effect, but, in addition to its drying function, simply to preserve the fabric at the stretch previously given it.

E is a stationary shaft, mounted upon the framing T, to support the revolving carrying and stretching rolls or wheels C C, and having secured upon it two hubs, F F, which are formed, as shown in section in Fig. 3, with reversely-tapering passages *e* through them, for the purpose of varying the oblique position of said hubs on the shaft E, with which they are made stationary by set or locking screws *d d*. These hubs F F extend through the ends or heads B B of the stretching or dragging frame and through the naves or centers of the selvage-rolls C C, which are arranged to freely and independently rotate on said hubs.

Thus it will be seen that on slacking the screws *d d* facility is afforded for either expanding or contracting the stretching-frame A, and for varying the length of the entire stretching surface or surfaces at the back, relatively to the front, by varying the obliquity of the ends B B and selvage-rolls C C to suit different widths of fabric, and for increasing or diminishing the amount of stretch, which amount is more or less, in proportion as the carrying-rolls, are set more or less divergent from each other.

To provide for the variation of the divergence of the heads B B with that of the carrying-rolls, the slats A A are connected with the said heads in a pivotal manner, as shown at *p p* in Fig. 2.

The selvage carrying and stretching rolls C C are shown as driven by friction-wheels G G, acting on their peripheries. These friction-wheels are driven by or through a pulley, H, arranged on their shaft to rotate at a speed which will give to the said rolls or wheels C C a slightly higher velocity than the drying-cylinder, for the purpose of delivering the fabric free from tension to the drying-cylinder.

By arranging the selvage-rolls to move independently of each other, and driving them by friction-wheels instead of by toothed gearing, allows automatically the motion of either selvage-roll to be temporarily retarded relatively to the motion of the other, or the motion of both to be temporarily retarded relatively to that of the drying-cylinder, whenever it may be desirable or necessary.

The shaft I of the friction-wheels G G is made in sections and jointed, as shown at *e e* in Fig. 2, to admit alike of the obliquity of the end sections of said shaft and of the wheels G G being changed to suit variations in the obliquity of the selvage-rolls C C, and which may be done by sliding in or out the standard J, that carries the center section of the shaft I, and also to admit of either or both friction-wheels G G, at pleasure, being thrown into or slipped out of driving-contact with the independently-hung selvage-rolls C C, so that only one or both of the selvage-rolls may be driven to effect feed as well as stretch of the fabric, or either or both of the same be left simply to rotate with and by the passage of the fabric over it or them, whereby the timely run of either or both selvage portions relatively to the center or body of the fabric or to each other may be regulated to the greatest nicety to secure a uniformity in the stretch throughout the width of the fabric.

This latter adjustment of the friction-wheels to make them drivers or not, as required, may be effected by suspending the outer ends of the end sections of the shaft I in raising and lowering stirrups or frames K, adjustable by screws *f f* from above.

The fabric to be stretched is to be laid or placed on a support arranged in front of the selvage carrying and stretching devices, and below the horizontal line where the selvage carrying and stretching devices on the two sides of the machine approach nearest to each other, which is the line on which the fabric is first received by the said devices.

The support so arranged for the fabric represented in the drawings consists of a platform or receptacle, L, which is represented as suspended by ropes *q* and pulleys U, but which may be otherwise so suspended at its opposite sides that it may be raised and lowered either uniformly at both sides or one side more than the other. By thus placing the fabric on a support below where it is received by the stretching devices, the portion of the fabric which is at any time passing upward from the said support hangs from the stretching devices, so that its own weight acts as a drag and tends to straighten it before its reception by the stretching devices, and it is more easily directed to the said devices by the attendant or attendants. By adjusting the receptacle L higher or lower the weight of the fabric so operating may be diminished or increased, as may be found desirable; and by raising or lowering one end of the support more than the other the weight of the fabric may be made greater at or toward one selvage or the other, which may be desirable in some cases to regulate the feed or drag of the two selvages.

The drying-cylinder D represented is a close steam-heated cylinder of the ordinary construction, except that it is furnished with teeth and points, as hereinafter described. I prefer to arrange it as close as practicable to the selvage-carrying rolls or wheels C C, in order that the stretch given to the different parts of the fabric may be set or retained by the drying operation.

In the machine represented the said cylinder is arranged so close to the selvage-carrying rolls or wheels C C that there is only just room for the fabric to pass between them. The said rolls or wheels are so arranged obliquely to each other that the parts of their two peripheries which are farthest apart, and where the lateral stretching of the fabric is completed, are the parts in most immediate proximity to the drying-cylinder, so that the fabric is delivered therefrom to the drying-cylinder without any opportunity for the lateral stretch to be lost, and hence the lateral stretch is retained in drying. The fabric may pass from the drying-cylinder D directly to the take-up rolls V V above, or may, before passing to the take-up rolls, be run over or under any additional number of drying-cylinders.

I claim—

1. The combination, in a machine for stretching or tentering mosquito-netting or other fabrics, of carrying or stretching devices for operating on the fabric near the selvages thereof, mechanism for imparting motion to the said carrying and stretching devices, and a friction frame or surface operating as a support and drag to the center or body of the fabric between the said carrying and stretching devices, substantially as herein specified.

2. The combination, in a machine for stretching or tentering mosquito-netting or other fabrics, of independently-hung selvage carrying and stretching devices for the two sides of the fabric, a drying-cylinder to which the stretched or tentered fabric is delivered from the said devices, and friction-wheels speeded to drive the said devices at a higher velocity than the drying-cylinder, substantially as herein described, for the purpose set forth.

3. The combination, with selvage-carrying rolls or wheels rotating independently of each other on a fixed shaft, and with an intermediate expanding and contracting stretching or dragging frame, of stationary hubs fitted to the said shaft, with reversely-tapering passages, and adjustable upon the said shaft, substantially as and for the purpose herein set forth.

4. The combination, with the selvage carrying and stretching devices in a machine for stretching and tentering fabrics, of a vertically-adjustable support arranged below the said carrying and stretching devices, substantially as and for the purpose herein described.

5. The combination, in a machine for stretching or tentering and dressing mosquito-netting or other fabrics, of carrying and stretching devices for operating on the fabric near the selvages thereof, mechanism for imparting motion to the said carrying and stretching devices, a friction frame or surface arranged between the said carrying and stretching devices and operating as a support and drag to the center or body of the fabric, and a heated drying-cylinder to which the stretched or tentered fabric is delivered from the said carrying and stretching devices and the said friction frame or surface, substantially as herein specified.

ISAAC E. PALMER.

Witnesses:
T. J. KEANE,
E. P. JESSUP.